US008537794B2

(12) United States Patent
Hirano et al.

(10) Patent No.: US 8,537,794 B2
(45) Date of Patent: Sep. 17, 2013

(54) PSEUDO-RESPONSE FRAME COMMUNICATION SYSTEM, PSEUDO-RESPONSE FRAME COMMUNICATION METHOD, AND PSEUDO-RESPONSE FRAME TRANSMITTING DEVICE

(75) Inventors: Yumi Hirano, Tokyo (JP); Tutomu Murase, Toyko (JP)

(73) Assignee: NEC Corporation, Tokyo (JP)

( * ) Notice: Subject to any disclaimer, the term of this patent is extended or adjusted under 35 U.S.C. 154(b) by 1022 days.

(21) Appl. No.: 12/529,886

(22) PCT Filed: Feb. 13, 2008

(86) PCT No.: PCT/JP2008/052337
§ 371 (c)(1),
(2), (4) Date: Sep. 3, 2009

(87) PCT Pub. No.: WO2008/108144
PCT Pub. Date: Sep. 12, 2008

(65) Prior Publication Data
US 2010/0020780 A1 Jan. 28, 2010

(30) Foreign Application Priority Data
Mar. 8, 2007 (JP) ................................ 2007-058557

(51) Int. Cl.
*H04W 4/00* (2009.01)
*H04W 24/00* (2009.01)
*H04B 7/00* (2006.01)

(52) U.S. Cl.
USPC ........ 370/338; 370/235; 370/310.1; 370/349; 370/352; 370/395.2; 709/227; 709/230; 709/234; 455/423

(58) Field of Classification Search
USPC .. 370/228–503; 709/227–234; 455/423–455
See application file for complete search history.

(56) References Cited

U.S. PATENT DOCUMENTS
6,772,334 B1 * 8/2004 Glawitsch ..................... 713/153
7,177,300 B2 * 2/2007 Murakami et al. ............ 370/349
(Continued)

FOREIGN PATENT DOCUMENTS
JP 6-141032 A 5/1994
JP 2002026935 A 1/2002
(Continued)

OTHER PUBLICATIONS
International Search Report for PCT/JP2008/052337 mailed Mar. 18, 2008.

*Primary Examiner* — Ayaz Sheikh
*Assistant Examiner* — Venkatesh Haliyur

(57) ABSTRACT

A great delay in communication and deterioration in quality are avoided from occurring.
A pseudo acknowledgement frame communication system includes: at least one communication device that transmits a frame; a second communication device that receives the frame; and a pseudo acknowledgement frame transmission device that monitors link-by-link communication between the first and second communication devices, in which the first communication device has a frame transmission means for transmitting a transmission frame to the second communication device, and an acknowledgement frame reception means for receiving an acknowledgement frame transmitted by the second communication device, the second communication device has an acknowledgement frame transmission means for transmitting the acknowledgement frame upon receiving the transmission frame from the first communication device, and the pseudo acknowledgement frame transmission device has a monitor means for monitoring the transmission frame transmitted by the first communication device, and a pseudo acknowledgement frame transmission means for generating a pseudo acknowledgement frame from a monitor result of the monitor means, based on a pseudo acknowledgement frame transmission condition, and transmitting the pseudo acknowledgement frame to the first communication device.

40 Claims, 9 Drawing Sheets

(56) References Cited

U.S. PATENT DOCUMENTS

| | | | |
|---|---|---|---|
| 7,500,046 B1 * | 3/2009 | Puri et al. | 710/311 |
| 7,613,143 B2 * | 11/2009 | Kakishima et al. | 370/328 |
| 2003/0067890 A1 * | 4/2003 | Goel et al. | 370/310.1 |
| 2003/0095537 A1 * | 5/2003 | Murakami et al. | 370/349 |
| 2004/0252696 A1 * | 12/2004 | Kakishima et al. | 370/395.2 |
| 2007/0254643 A1 * | 11/2007 | Garcia et al. | 455/423 |
| 2008/0253376 A1 * | 10/2008 | Charzinski | 370/395.2 |

FOREIGN PATENT DOCUMENTS

| | | |
|---|---|---|
| JP | 2003046432 A | 2/2003 |
| JP | 2003158558 A | 5/2003 |
| WO | 02056632 A | 7/2002 |

* cited by examiner

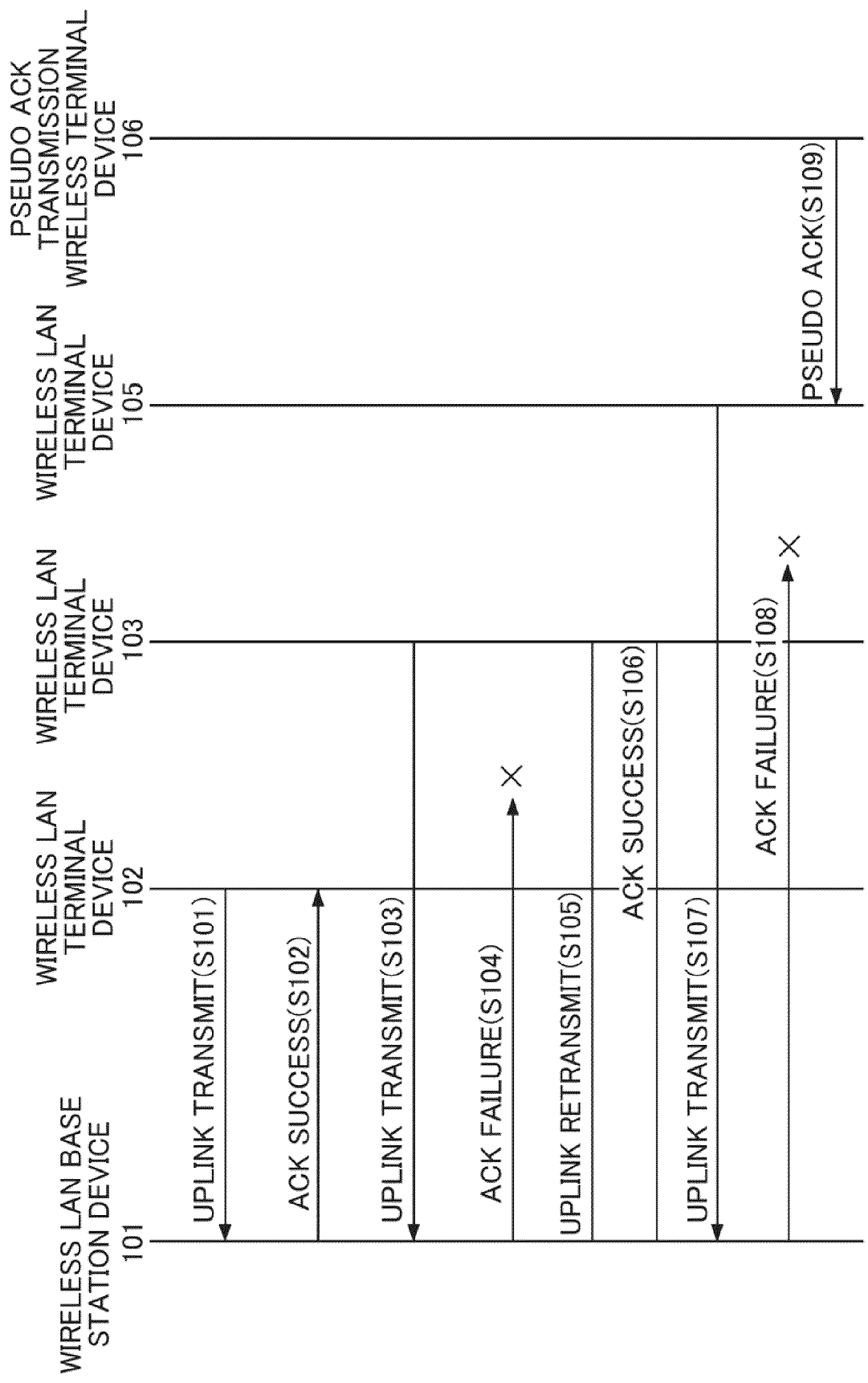

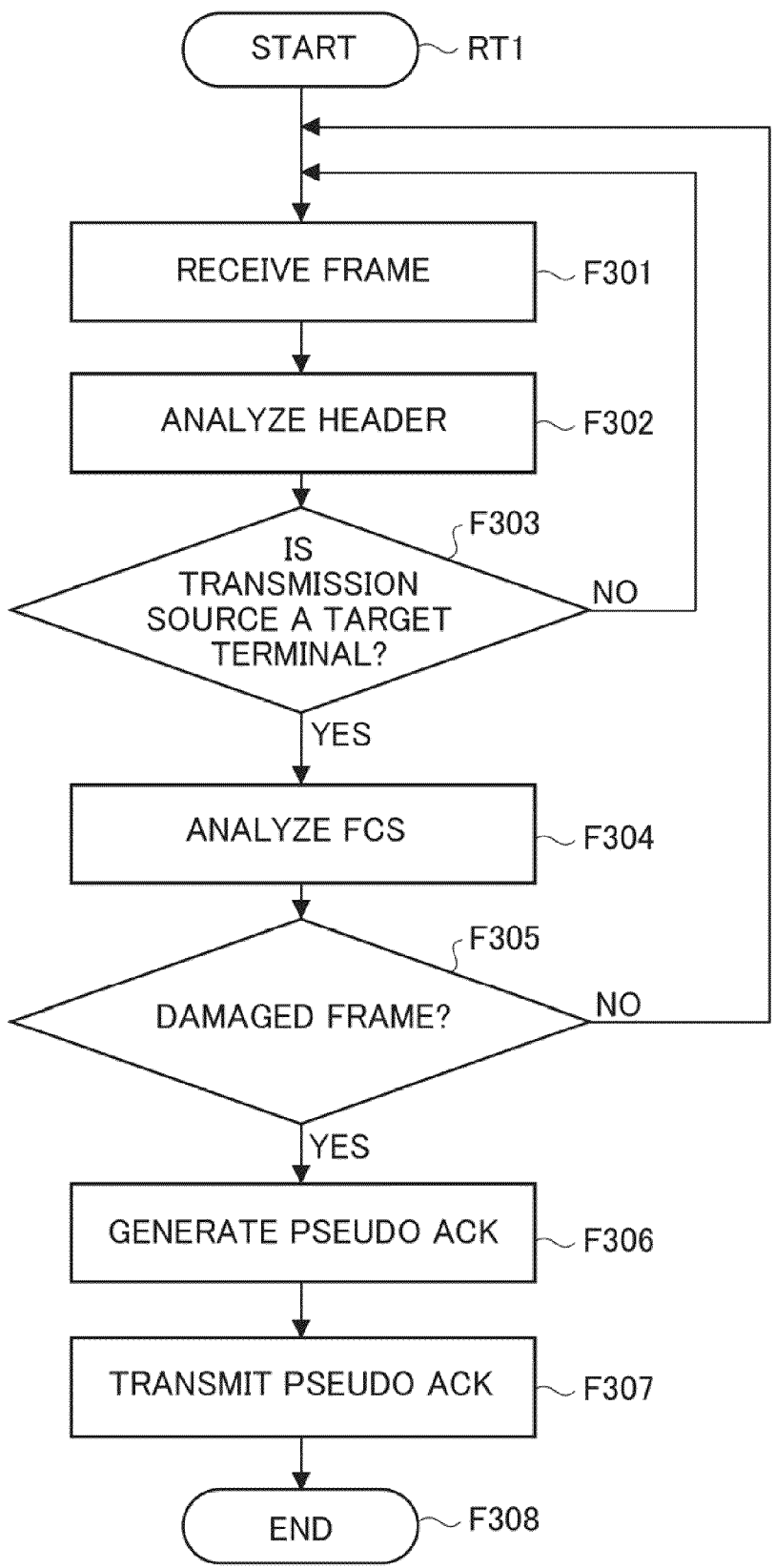

PSEUDO-RESPONSE FRAME COMMUNICATION SYSTEM, PSEUDO-RESPONSE FRAME COMMUNICATION METHOD, AND PSEUDO-RESPONSE FRAME TRANSMITTING DEVICE

The present invention is the National Phase of PCT/JP2008/052337, filed Feb. 13, 2008, which is based on and claims priority from Japanese Patent Application No. 2007-058557 (filed Mar. 8, 2007) the content of which is hereby incorporated in its entirety by reference into this application.

TECHNICAL FIELD

The present invention relates to a pseudo acknowledgment frame communication system, a pseudo acknowledgment frame communication method, a pseudo acknowledgment frame transmission device, a pseudo acknowledgment frame transmission method, and a pseudo acknowledgment frame transmission program, and particularly to a pseudo acknowledgment frame communication system, a pseudo acknowledgment frame communication method, a pseudo acknowledgment frame transmission device, a pseudo acknowledgment frame transmission method, and a pseudo acknowledgment frame transmission program, which monitor a communication quality and transmits a pseudo acknowledgment frame.

BACKGROUND ART

Recently, as communication networks have speeded up, plural applications have come to coexist to meet requests from users, and high quality communication has been demanded. Accordingly, priority control is needed for each of such applications.

In particular, to ensure communication quality is mandatory for real-time applications for voice communications and video phones.

A technique for ensuring reliability of communication quality as described above will be TCP (transmission control protocol).

TCP is a protocol capable of performing secure data transfer through a logical connection independent from end-end media. Besides, TCP is responsible for part of congestion control in networks.

Specifically, for example, an acknowledgement packet is transmitted by TCP to acknowledge receipt of a transmitted segment. If the acknowledgement packet has not been received, the segment is considered as having been lost and retransmission control is then executed.

Further in this case, a transmission rate is decreased by decreasing a parameter called a congestion window. After once decreasing the transmission rate, the TCP works to gradually increase the rate. There are two methods of increasing this rate, e.g., "slow start" and "congestion avoidance".

Since quality is more influenced by the "slow start" among the two methods, to avoid the "slow start" as much as possible is important for TCP control.

On the other side, as communication control dependents on media, there is link-by-link control which is resource access control for media. An example thereof will be CSMA/CA (carrier sense multiple access with collision avoidance) according to a random access scheme (wireless LAN (local area network)) for shared media.

Generally in communication using an end-end protocol such as TCP, plural communications (flows) are usually present on one link-by-link protocol such as CSMA/CA.

Further, a common way of thinking protocol layers suggests that end-end control and link-by-link control are performed independently.

A MAC (media access control) protocol for wireless LAN systems, which is defined by IEEE (Institute of Electrical and Electronics Engineers) 802.11, belongs to the link-by-link control.

In a wireless LAN, a wireless LAN terminal device transmits a data frame. Upon elapse of a time called SIFS (short inter frame space) since a receiving terminal device which receives the data frame completes receipt thereof, the receiving terminal device transmits an acknowledgement frame (which is called an ACK frame) as an acknowledgement frame in the wireless LAN.

In this case, a MAC address of the wireless LAN terminal device as a transmission terminal of the data frame is designated as a destination address of the ACK frame.

The SIFS time is the shortest possible acknowledgment time in consideration of propagation time, etc. The SIFS time varies depending on the modulation method of the physical layer. According to IEEE802.11b and 11g, the SIFS time is ten seconds.

If the wireless LAN terminal device has not yet received the acknowledgement frame (ACK frame) at predetermined timing even after elapse of the SIFS time, the wireless LAN terminal device retransmits the data frame.

Also, when no ACK frame is received in response to the retransmitted data frame, the wireless LAN terminal device carries out retransmission repeatedly up to the maximum number of retransmissions.

The maximum number of retransmissions is seven as a default value which depends on actual implements of the wireless LAN terminal device. If the manufacturer or vendor changes, the maximum number of retransmissions changes.

CITATION LIST

Patent Literature

{PTL 1} International Application Publication No. 2002/056632

SUMMARY OF INVENTION

Technical Problem

Meanwhile, link-by-link communication such as a wireless LAN has a first problem that head-of-line blocking of a flow occurs.

That is, because of link-by-link retransmission of a frame (frame A-1) in a flow A, another frame (frame B-1) in a flow B subsequent to the frame A in a transmission queue cannot be transmitted but is made wait and causes deterioration in quality.

For example, if the flow A is data communication of low quality and the flow B is an IP phone of high quality, the frame in the flow B needs to be transmitted smoothly.

In this case, reasonably, the frame in the flow B should be transmitted even by disposing of the frame in the flow A. In general, however, many of shared media access controls and link-by-link protocols do not have such a function.

Therefore, there is a first problem of impossibility to carry out priority processing that no subsequent frames can be transmitted until transmission of a frame which is given a chance of transmission is completed including retransmission of the frame.

The first problem occurs not only in waiting for a turn at one single queue but also in plural terminals which share media. For example, if one terminal repeats transmission and retransmission among plural terminals, the other ones of the plural terminals can hardly obtain a change of transmission. A similar problem therefore occurs.

On the other side, there is a disclosure with respect to TCP, which relates to a data communication system using TCP data to prevent retransmission (see PTL 1).

PTL 1 gives a description concerning a data communication system using TCP data in which decrease in throughput is controlled by using a pseudo receipt acknowledgement signal.

However, matters concerning the data communication system described in PTL 1 are aiming for avoidance of slow start processing.

That is, if TCP data and an ACK signal do not arrive normally, slow start processing of reducing once a transmission data volume and thereafter gradually increasing the transmission data volume for a constant time is simply avoided.

Therefore, the matters concerning the data communication system described in PTL 1 have a second problem that priority processing cannot be achieved because of not having a function of priority control.

Further, as described above, the retransmission mechanism in wireless LAN generally performs retransmission independently from TCP.

Therefore, even TCP causes a problem that a segment is determined as having been lost, in an environment that retransmission takes place in a wireless LAN terminal device and frames are therefore hard to arrive due to some reason such as a high band occupancy, or retransmission takes place many times due to the large number of maximum retransmissions.

If a segment is determined as having been lost, there is a problem that one data frame is transmitted doubly, and a delay of a frame or segment which waits for transmission increases.

As a result, in this case, users recognize that a great delay in communication or deterioration in quality occurs between a base station and a wireless LAN terminal device.

Such a problem is not only limited to TCP but also occurs similarly in application to UDP (user datagram protocol).

The UDP is a protocol which reduces delays as much as possible, allowing packet loss to some extent, without issuing an acknowledgement in response to a packet or without performing retransmission dependent on an acknowledgement.

Notwithstanding the above, a wireless LAN has a problem that a delay of wireless LAN part is increased by trying retransmission plural times.

Therefore, there is a third problem that processing of selectively generating a pseudo ACK cannot be performed.

In addition, according to a method based on a pseudo ACK of TCP described in PTL 1, loss of a packet can be known and a pseudo ACK can be generated by the TCP. On the other side, no acknowledgment is made knowing and considering content of a lost packet.

Therefore, in what case a pseudo ACK is transmitted is not disclosed. If a pseudo ACK is transmitted thoughtlessly, an original function of TCP of performing secure data transfer as described above is greatly hindered.

That is, in generation of a pseudo ACK of TCP, a pseudo ACK is transmitted without checking which data has been lost. This gives rise to a problem that important retransmission of data is not carried out.

The present invention has hence been made in view of the above problems and has an object of providing a pseudo acknowledgment frame communication system, a pseudo acknowledgment frame communication method, a pseudo acknowledgment frame transmission device, a pseudo acknowledgment frame transmission method, and a pseudo acknowledgment frame transmission program, by which required delay time can be properly reduced by properly restricting retransmission control in a wireless LAN, and accordingly, a great delay in communication or deterioration in quality is avoided from being recognized as occurring.

Solution to Problem

According to an aspect of the present invention, there is provided a pseudo acknowledgement frame communication system including: at least one communication device that transmits a frame; a second communication device that receives the frame; and a pseudo acknowledgement frame transmission device that monitors communication between the first and second communication devices, in which the first communication device comprises a frame transmission unit for transmitting a transmission frame to the second communication device; and an acknowledgement frame reception unit for receiving an acknowledgement frame transmitted by the second communication device, the second communication device comprises an acknowledgement frame transmission unit for transmitting the acknowledgement frame upon receiving the transmission frame from the first communication device, and the pseudo acknowledgement frame transmission device comprises a monitor unit for monitoring the transmission frame transmitted by the first communication device and the acknowledgement frame transmitted by the second communication device, and a pseudo acknowledgement frame transmission unit for generating a pseudo acknowledgement frame if a monitor result by the monitor unit satisfies a pseudo acknowledgement frame transmission condition, and transmitting the generated pseudo acknowledgement frame to the first communication device.

According to another aspect of the invention, there is provided a pseudo acknowledgement frame communication method for a pseudo acknowledgement frame communication system including at least one communication device that transmits a frame, a second communication device that receives the frame, and a pseudo acknowledgement frame transmission device that monitors communication between the first and second communication devices, the pseudo acknowledgement frame communication method including: a frame transmission step in which the first communication device transmits a transmission frame to the second communication device; an acknowledgement frame transmission step in which the second communication device transmits the acknowledgement frame upon receiving the transmission frame from the first communication device; a monitor step in which the pseudo acknowledgement frame transmission device monitors the transmission frame transmitted by the first communication device and the acknowledgement frame transmitted by the second communication device; a pseudo acknowledgement frame transmission step in which the pseudo acknowledgement frame transmission device generates a pseudo acknowledgement frame if a monitor result by the monitor step satisfies a pseudo acknowledgement frame transmission condition, and transmits the generated pseudo acknowledgement frame to the first communication device, and an acknowledgement frame reception step in which the first communication device receives the acknowledgement frame transmitted in the acknowledgement frame transmission step or the pseudo acknowledgement frame transmitted in the pseudo acknowledgement frame transmission step.

According to still another aspect of the invention, there is provided a pseudo acknowledgement frame transmission device, including: a monitor unit for monitoring a transmission frame transmitted by the first communication device and an acknowledgement frame transmitted by the second communication device; and a pseudo acknowledgement frame transmission unit for generating a pseudo acknowledgement frame if a monitor result by the monitor unit, satisfies a pseudo acknowledgement frame transmission condition, and transmitting the generated pseudo acknowledgement frame to the first communication device.

According to still another aspect of the invention, there is provided a pseudo acknowledgement frame transmission method in a pseudo acknowledgement frame transmission device that monitors frames used in communication between a first communication device and a second communication device, including: a monitor step of monitoring a transmission frame transmitted by the first communication device and an acknowledgement frame transmitted by the second communication device; and a pseudo acknowledgement frame transmission step of generating a pseudo acknowledgement frame if a monitor result by the monitor step satisfies a pseudo acknowledgement frame transmission condition, and transmitting the generated pseudo acknowledgement frame to the first communication device.

According to still another aspect of the invention, there is provided a pseudo acknowledgement frame transmission program product, embodied on a computer readable medium, causing a computer to function as a pseudo acknowledgement frame transmission device, the pseudo acknowledgement frame transmission device including: a monitor unit for monitoring a transmission frame transmitted by the first communication device and an acknowledgement frame transmitted by the second communication device; and a pseudo acknowledgement frame transmission unit for generating a pseudo acknowledgement frame if a monitor result by the monitor unit satisfies a pseudo acknowledgement frame transmission condition, and transmitting the generated pseudo acknowledgement frame to the first communication device.

Advantageous Effects of Invention

According to the present invention, even if transmission of a data frame on wireless LAN fails or even if an ACK frame does not reach, a retransmission function to be carried out, superimposed on the wireless LAN and an upper layer can be properly controlled by transmitting a pseudo ACK frame. Therefore, required delay time can be properly suppressed.

BRIEF DESCRIPTION OF DRAWINGS

FIG. 3 A sequence chart representing operation of each wireless terminal device according to the first embodiment of the present invention.

FIG. 9 A flowchart representing operation of a pseudo ACK transmission wireless terminal device according to the third embodiment of the present invention.

DESCRIPTION OF EMBODIMENTS

Embodiments of the present invention propose a pseudo ACK frame transmission wireless terminal device (corresponding to a pseudo acknowledgement frame transmission device in the invention), which is different from a wireless LAN terminal device (corresponding to a first communication device in the invention) and a wireless LAN base station device (corresponding to a second communication device in the invention). The pseudo ACK frame transmission wireless terminal device receives all frames which are exchanged under a wireless base station device as a target of a wireless LAN.

Further, if an acknowledgement frame (hereinafter referred to as an ACK or ACK frame) is not transmitted to a wireless LAN terminal device for which communication quality is to be ensured, a pseudo acknowledgement frame (hereinafter referred to as a pseudo ACK or pseudo ACK frame) is transmitted.

Link-by-link communication is a prerequisite here. Therefore, the pseudo ACK frame means an acknowledgement frame which is exchanged by a physical communication path between communication devices.

The term of link-by-link means a partial section (link) between one communication device (at an end) and another communication device (at another end) (referred to as "end-end"), i.e., a control unit which is controlled by a protocol subordinate to an end-end protocol.

The embodiments according to the invention are applicable to systems in which retransmission control is performed independently from TCP on a MAC layer, among communication systems.

In the following, descriptions will be made with reference to wireless LAN communication as a typical one of examples of communication systems which transmit an acknowledgement frame (ACK) and control retransmission on a MAC layer. The embodiments, however, are not limited to this wireless LAN communication but may be, for example, Bluetooth (registered trademark), WiMAX (worldwide interoperability for microwave access: IEEE802.16), IEEE802.20, or PLC (power line communication) as communication using the same access scheme as wireless LAN.

Next, configurations of the embodiments according to the present invention will be described in details with reference to the drawings.

First Embodiment

(1) Wireless Communication Control System According to the First Embodiment (Corresponding to the Pseudo Acknowledgement Frame Communication System in the Invention)

(1-1) Configuration of Wireless Communication Control System

Next, a configuration of a wireless communication control system according to the first embodiment of the present invention will be described in detail with reference to the drawings.

Figure 1:
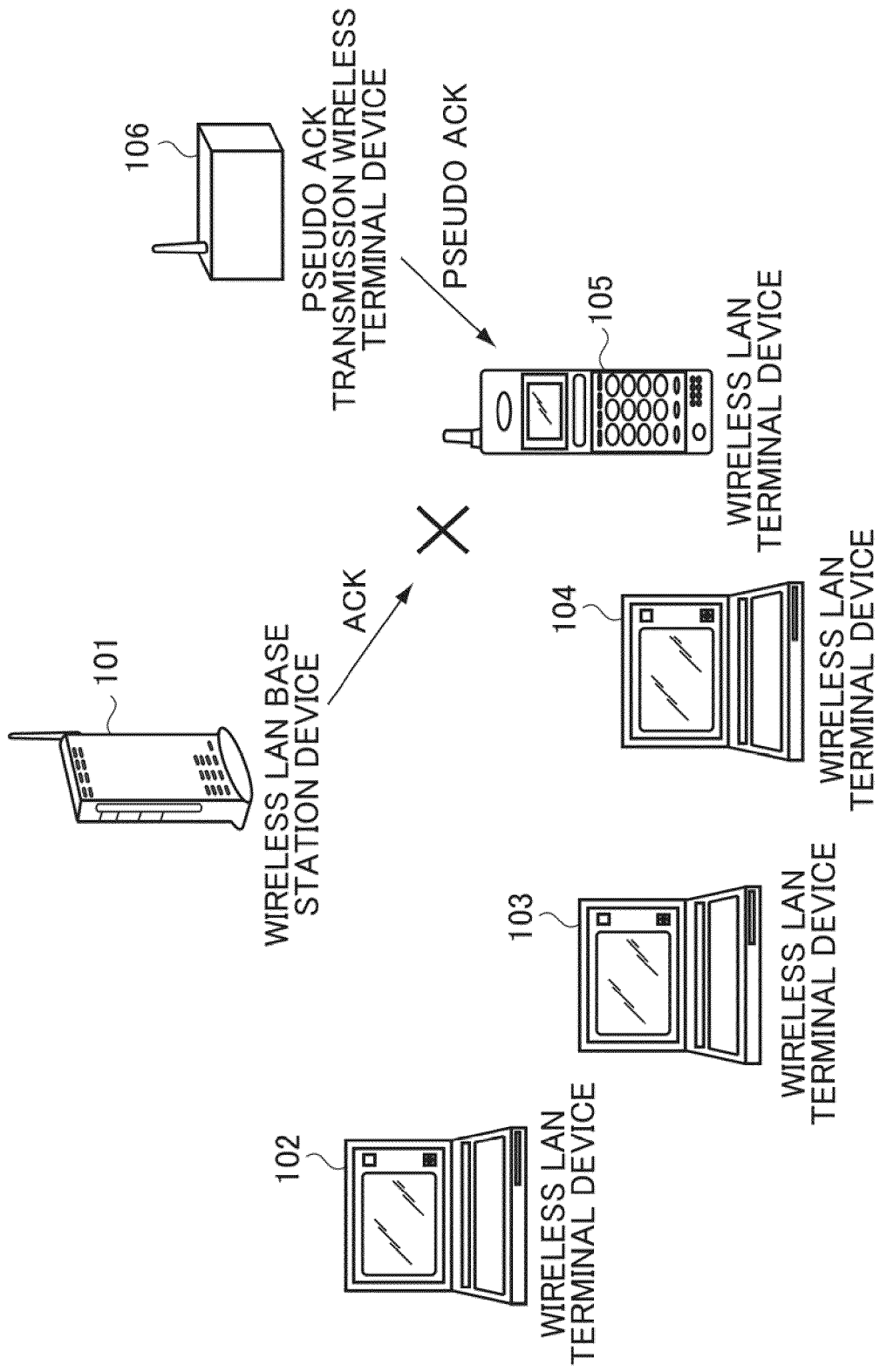
FIG. 1 A block diagram of a wireless communication control system according to a first embodiment of the present invention.

Referring to FIG. 1, the wireless communication control system of the embodiment includes a wireless LAN base station device 101, plural wireless LAN terminal devices 102 to 105, and a pseudo ACK frame transmission wireless terminal device 106.

In this embodiment, the wireless LAN terminal device 105 is a target terminal device for which communication quality is to be ensured.

The pseudo ACK frame generation wireless terminal device 106 monitors communication made under the wireless LAN base station device 101.

Specifically, the wireless LAN terminal device 105 transmits a data frame to the wireless LAN base station device 101, and the pseudo ACK transmission wireless terminal device 106 monitors an ACK in response to the data frame to be further transmitted by the wireless LAN base station device 101 If no ACK is detected, the pseudo ACK transmission wireless terminal device 106 transmits a pseudo ACK, in place of the wireless LAN base station device 101.

Figure 2A:
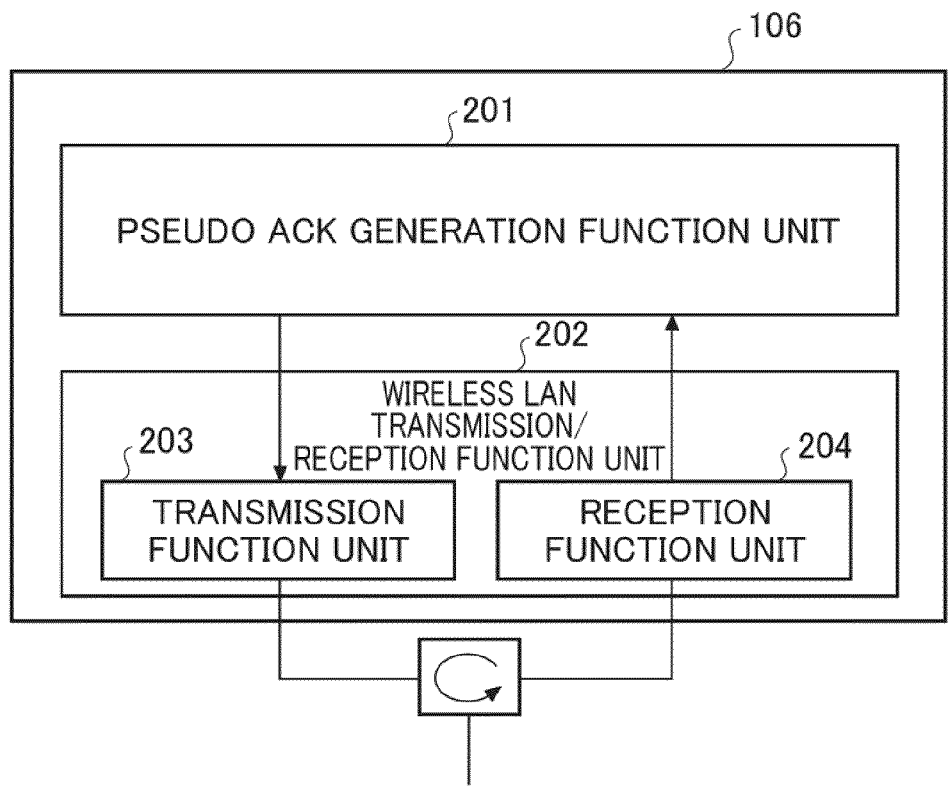
FIGS. 2A, 2B Block diagrams representing configurations of a pseudo ACK transmission wireless terminal device and a pseudo ACK generation function unit according to the first embodiment of the present invention.
Figure 2B:
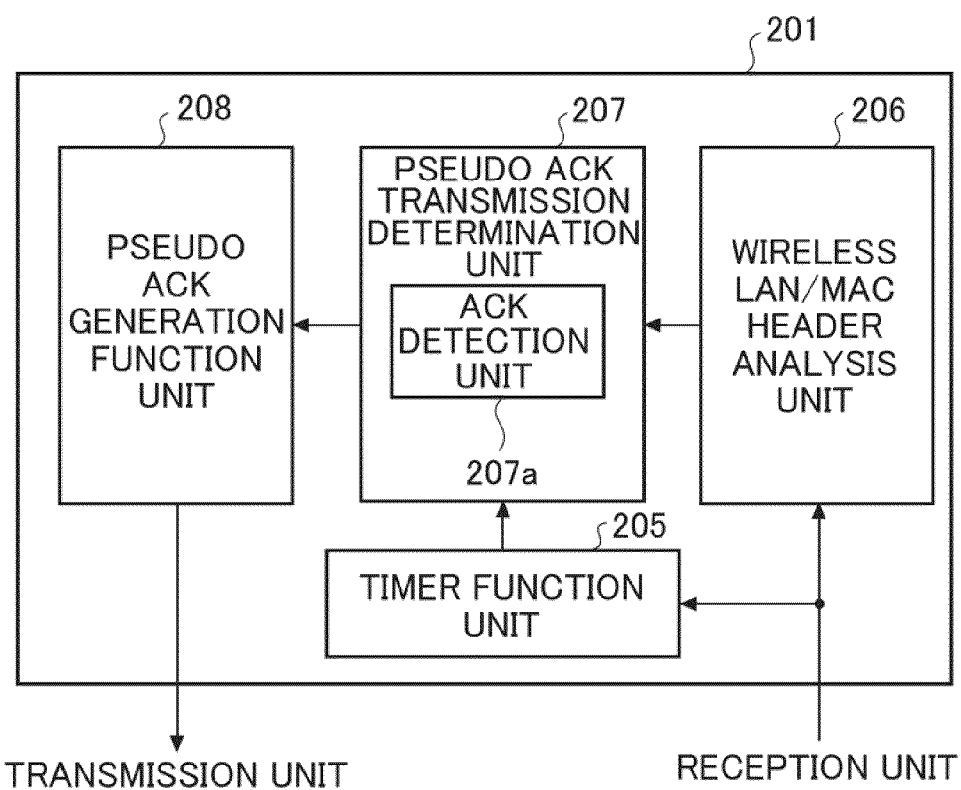

FIGS. 2A, 2B are block diagrams of the pseudo ACK frame generation wireless terminal device 106 in the wireless communication system according to this embodiment.

Referring to FIG. 2A, the pseudo ACK frame generation wireless terminal device 106 includes a wireless LAN communication function unit 202 which performs transmission/reception through the wireless LAN, and a pseudo ACK generation function unit 201 which performs the control thereof.

The wireless LAN communication function unit 202 includes a reception function unit 204 and a transmission function unit 203. The reception function unit 204 constantly senses a carrier and receives frames, and transfers received frames to the pseudo ACK generation function unit 201. The transmission function unit 203 transmits an ACK frame if no ACK is detected.

FIG. 2B is a block diagram depicting details of the pseudo ACK generation function unit 201 in the pseudo ACK transmission wireless terminal device 106.

In the pseudo ACK generation function unit 201 (FIG. 2B), a timer function unit 205 (FIG. 2B) is notified of completion of reception of a frame by the reception function unit 204 of the wireless LAN communication function unit 202 (FIG. 2A). The frame is supplied to a wireless LAN/MAC header analysis unit 206.

The timer function unit 205 counts time since the completion of reception, and notifies a pseudo ACK transmission determination unit 207 of timing when an ACK is detected, upon elapse of SIFS time (10 μseconds in case of IEEE802.11b and IEEE802.11g). Considering an error, ACK reception timing may be notified after waiting for further several μseconds.

The wireless LAN/MAC header analysis unit 206 analyzes a frame type of a MAC header and a transmission source address of the received frame. If the frame type is a data type and if the transmission source address is a target of a pseudo ACK, the frame is supplied to the pseudo ACK transmission determination unit 207.

Whether a pseudo ACK should be transmitted or not is determined by the pseudo ACK transmission determination unit 207 in a case that an ACK detection unit 207a in the ACK transmission determination unit 207 does not detect an ACK from the wireless LAN/MAC header analysis unit 206 before the timer function unit 205 notifies of SIFS time when an ACK is to be transmitted.

That is, if the ACK detection unit 207a detects an ACK, it is determined that a pseudo ACK should not be transmitted. If it is determined that a pseudo ACK is to be transmitted, the pseudo ACK transmission determination unit 207 requests generation of a pseudo ACK from the pseudo ACK generation function unit 208.

The pseudo ACK generation function unit 208 generates a pseudo ACK addressed to a corresponding wireless terminal device, and transfers the pseudo ACK to the transmission unit 203 of the wireless LAN transmission/reception function unit 202, thereby transmitting the pseudo ACK.

The pseudo ACK transmission determination unit 207 counts the number of retransmissions to the corresponding wireless terminal device, and determines that a pseudo ACK should be transmitted only when the number of retransmissions exceeds a particular number of retransmissions. Alternatively, an upper limit of the number of retransmission may be changed depending on a degree of quality to ensure.

(1-2) Whole Operation of Wireless Communication Control System

Next, whole operation of a wireless communication control system according to the first embodiment will be described in detail, referring to a flowchart of FIG. 3.

FIG. 3 is a sequence diagram according to the first embodiment of the present invention.

The wireless LAN terminal device 105 is still supposed to be a target terminal device for which communication quality is to be ensured.

At first, the wireless LAN terminal device 102 transmits (denoted by Uplink transmission in the figure) a data frame to the wireless LAN base station device 101 (step S101).

Next, the wireless LAN base station device 101 receives a data frame from the wireless LAN terminal device 102 as a transmission source, and then transmits an ACK frame in response to the data frame (step S102).

Subsequently, the wireless LAN terminal device 103 also transmits a data frame to the wireless LAN base station device 101 (step S103).

However, until elapse of SIFS time from then, no ACK frame has been transmitted from the wireless LAN base station device 101 to the wireless LAN terminal device 103 (step S104).

Hence, the wireless LAN terminal device 103 determines that the wireless LAN base station device 101 has not received any data frame, and performs retransmission (S105).

In this case, the pseudo ACK transmission wireless terminal device 106 does not transmit a pseudo ACK because the wireless LAN terminal device 103 is not a target terminal to which a pseudo ACK is to be transmitted.

Therefore, if the wireless LAN terminal device 103 receives a retransmitted data frame, the wireless LAN base station device 101 then transmits an ACK frame in response to the retransmitted data frame (step S106). Operation up to this step is the same as in conventional wireless LAN communication.

Further in this embodiment, the wireless LAN terminal device 105 as a target terminal for a pseudo ACK also transmits a data frame to the wireless LAN base station device 101 (step S107).

As in the step S104, until elapse of SIFS time therefrom, no ACK frame has been transmitted from the wireless LAN base station device 101 to the wireless LAN terminal device 105 (step S108).

The pseudo ACK transmission wireless terminal device 106, which monitors this step, transmits a pseudo ACK addressed to the wireless LAN terminal device 105 before the wireless LAN terminal device 105 performs retransmission (step S109).

Here, the pseudo ACK transmission determination unit 207 may count retransmissions to the wireless terminal device 105 as a target terminal, and the pseudo ACK transmission wireless terminal device 106 may then transmit a pseudo ACK only when the number of retransmissions exceeds a particular number of retransmissions, to restrict the maximum number of retransmissions. Further, an upper limit to the number of retransmissions may be changed depending on a degree of quality to ensure.

(1-3) Operation of Pseudo ACK Transmission Wireless Terminal Device

Next, referring to a flowchart in FIG. 4, operation of the pseudo ACK transmission wireless terminal device 106 according to first embodiment will be described in details below.

Figure 4:
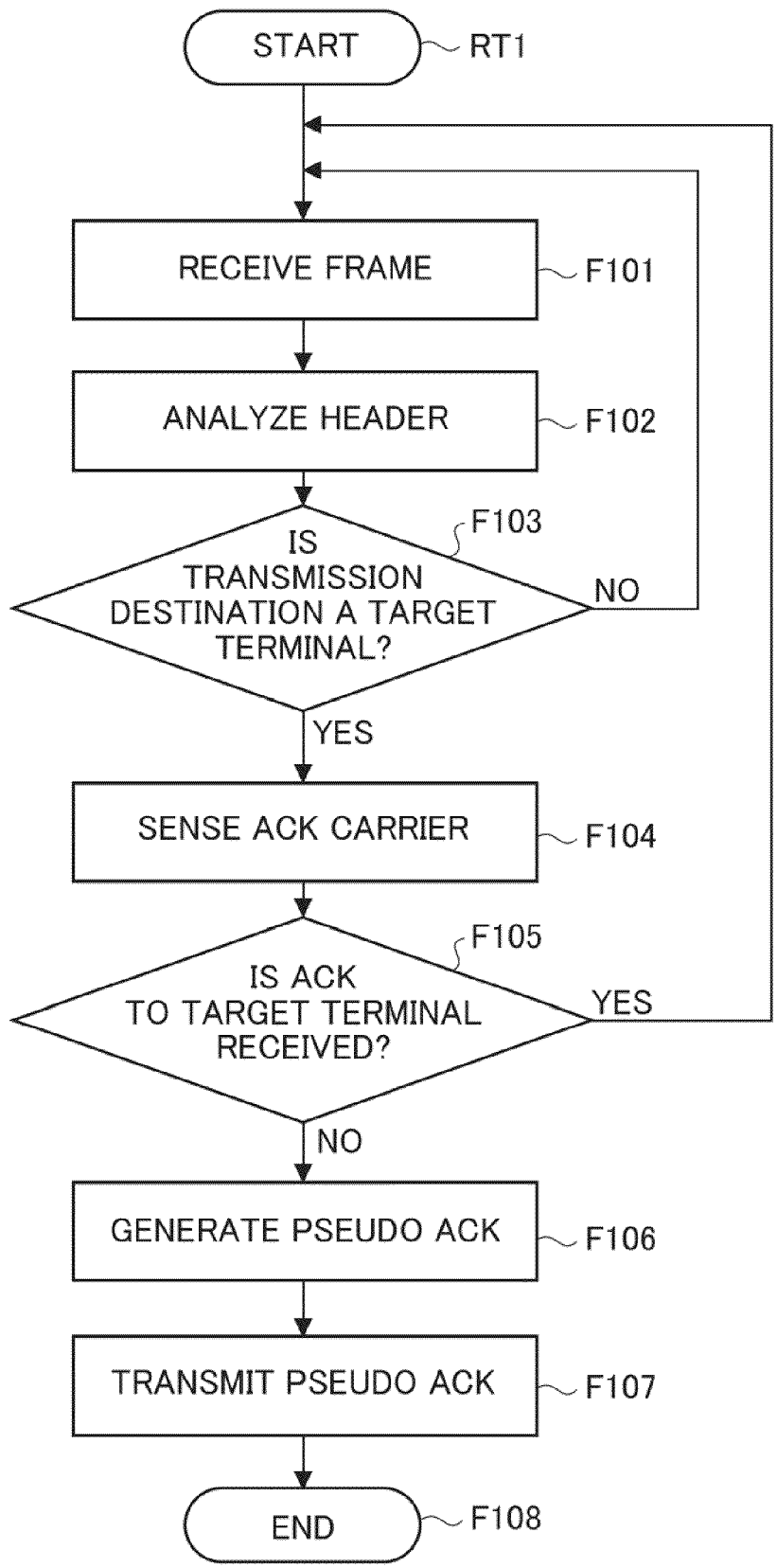
FIG. 4 A flowchart representing operation of each pseudo ACK transmission wireless terminal device according to the first embodiment of the present invention.

Although steps of the flowchart in FIG. 4 do not directly correspond to steps in a sequence chart in FIG. 3 because of difference in configuration, operation in FIG. 4 almost corresponds to that in FIG. 3.

At first, the pseudo ACK transmission wireless terminal device 106 receives a frame through a reception unit 204 (FIG. 2A) in the wireless LAN communication function unit 202 (step F101), and the wireless LAN/MAC header analysis unit 206 (FIG. 2B) analyzes a frame type in a MAC header and an address of a transmission source (step F102).

If a corresponding frame is not a data frame or if a transmission source is not a terminal as a target to ensure communication quality, the processing returns to step F101 (step F103).

If the transmission source is a terminal as a target to ensure communication quality and if the frame type thereof is a data frame, the pseudo ACK transmission determination unit 207 (FIG. 2B) waits until SIFS time is notified of from the timer function unit 205 and waits for detection of an ACK addressed to the wireless LAN terminal device 105 (step F104).

If an ACK to the wireless LAN terminal device 105 as a target terminal can then be detected, the processing returns to step F101.

Otherwise, if transmission of an ACK frame to the wireless LAN terminal device 105 as a target terminal cannot be confirmed, a pseudo ACK is generated by the pseudo ACK generation function unit 208 (step F106), and the pseudo ACK is transmitted through the transmission function unit 203 in the wireless LAN communication function unit 202 (FIG. 2A, step F107).

At this time, the pseudo ACK transmission wireless terminal device 106 may then count the number of retransmissions to the wireless terminal device 105 as a target by the pseudo ACK transmission determination unit 207 (FIG. 2B). Only when a particular number of retransmissions is exceeded, a pseudo ACK may be transmitted to restrict the maximum number of retransmissions (corresponding to a pseudo acknowledgement packet transmission condition in the present invention).

Further, an upper limit to the number of retransmissions may be changed depending on a degree of quality to ensure.

(1-4) Effects of Wireless Communication Control System according to First Embodiment According to this embodiment, in the wireless communication control system according to the embodiment, the pseudo ACK transmission wireless terminal device 106 can reduce a delay of communication which users suffer, by restricting retransmissions using MAC of the wireless LAN.

The pseudo ACK according to this embodiment deals with link-by-link communication as a target. Therefore, head of line blocking can be eliminated.

That is, conventionally, when plural flows are queued into one queue, a head frame continues being retransmitted, thereby making the head frame stay at the queue, and blocking frame transmission of following flows.

In contrast, according to this embodiment, as the pseudo ACK transmission wireless terminal device 106 transmits a pseudo ACK, the wireless LAN terminal device 105 determines the transmission to be successful, and frames can thereby avoid staying at a queue.

Further, the maximum number of retransmissions depends on actual equipment and varies depending on vendors or products. Therefore, a limited band allocation can be properly and effectively controlled by restricting the number of retransmissions of the wireless LAN for each terminal.

Particularly in a wireless LAN environment such as a hot spot, the maximum number of retransmissions from a wireless LAN base station device can be managed. However, setting of the maximum number of retransmissions of a wireless LAN terminal device itself cannot be managed.

Also according to this embodiment, there is no need of modifying or repurchasing an existing wireless LAN base station device and a wireless LAN terminal device. The number of retransmissions can be controlled in consideration of a whole network, by merely installing a pseudo ACK transmission wireless terminal device having functions according to the embodiment of the present invention.

Second Embodiment

(2) Wireless Communication Control System According to the Second Embodiment

(2-1) Configuration of Wireless Communication Control System

Next, a configuration of a wireless communication control system according to the second embodiment of the present invention will be described with reference to the drawings.

Figure 5:
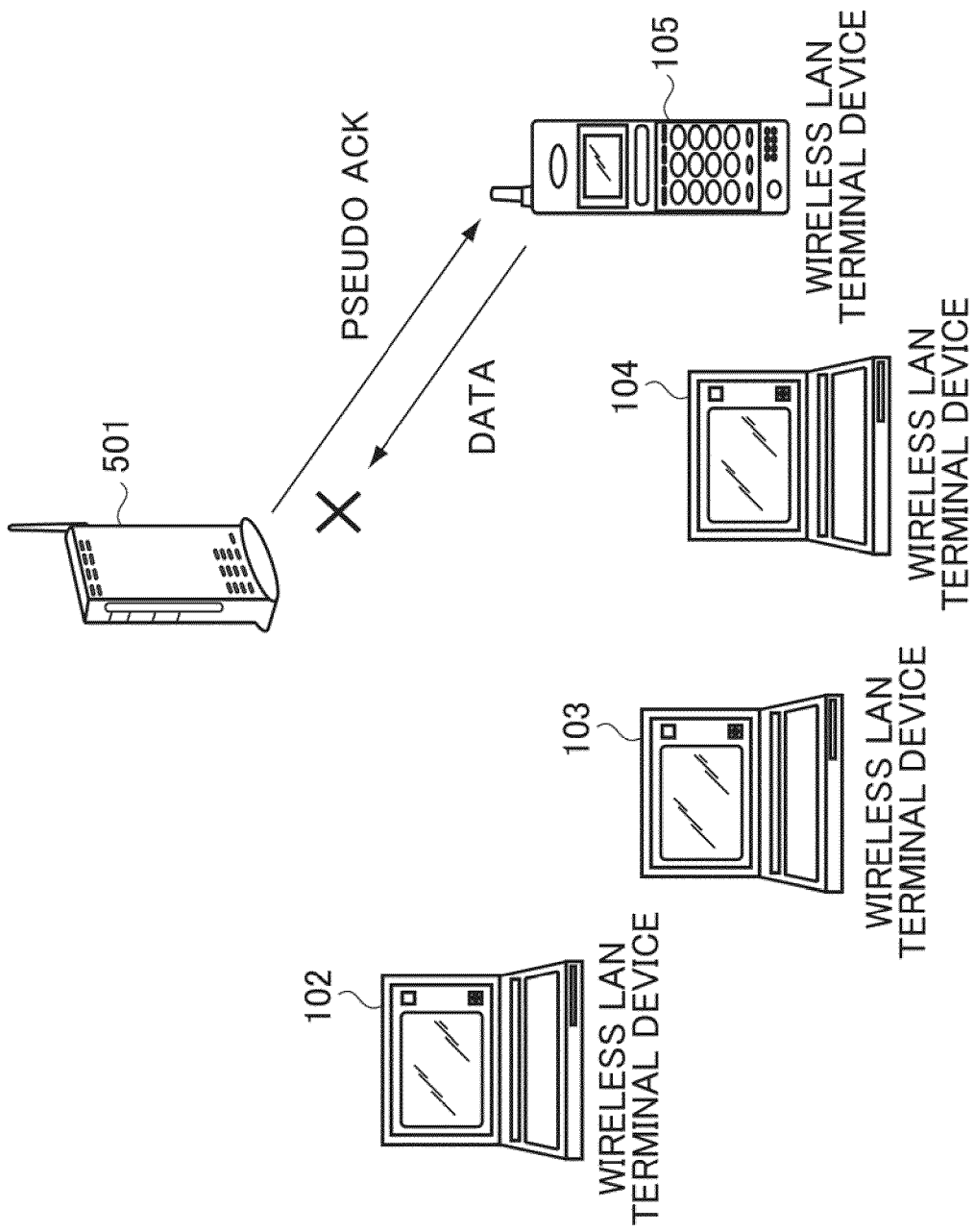
FIG. 5 A view depicting a configuration of a wireless communication control system according to a second embodiment of the present invention.

In the wireless communication control system according to the second embodiment depicted in FIG. 5, a wireless LAN base station device 501 is provided with the function of the pseudo ACK generation function unit 201 of the pseudo ACK transmission wireless terminal device 106 according to the first embodiment described above.

A wireless LAN base station device 501 of the embodiment has a function to transmit an ACK frame even when an error data frame is received.

Referring now to FIG. 5, the wireless communication control system according to this embodiment includes the wireless LAN base station device 501 having the function of the pseudo ACK transmission wireless terminal device 106, and plural wireless LAN terminal devices 102 to 105.

Also, in this embodiment, the function to transmit a pseudo ACK depicted in the pseudo ACK transmission wireless terminal device 106 takes the wireless LAN terminal device 105 as a target to ensure communication quality.

Figure 6A:
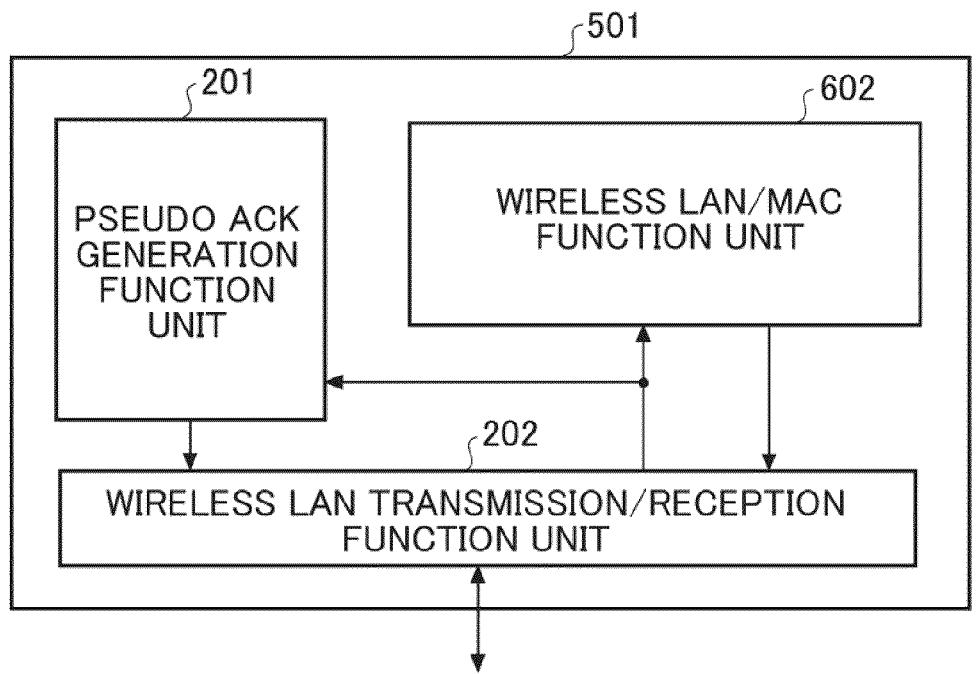
FIGS. 6A, 6B Diagrams showing configurations of a wireless LAN base station device according to the second embodiment of the present invention.
Figure 6B:
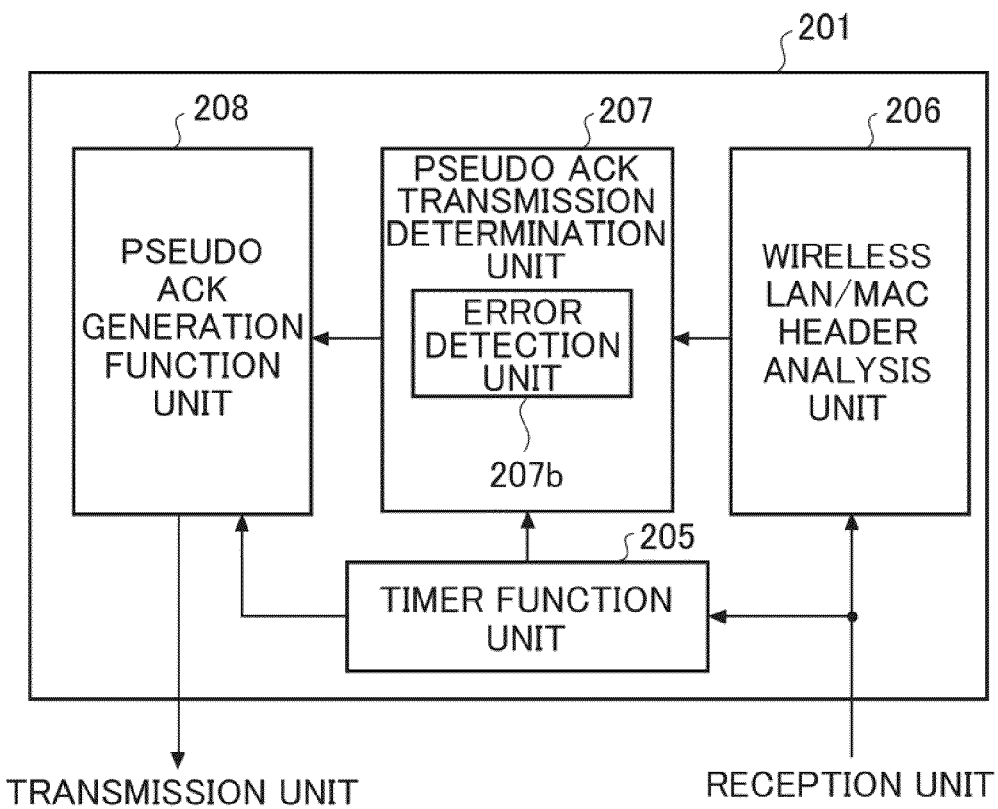

FIGS. 6A, 6B are diagrams showing configurations of the wireless LAN base station device 501 of the wireless communication system according to this embodiment.

Referring to FIG. 6A, the wireless LAN base station device 501 has a pseudo ACK generation function unit 201 in addition to a wireless LAN transmission/reception function unit 202 which performs the function of a usual wireless LAN base station, and a wireless LAN/MAC function unit 602.

Upon receiving a wireless LAN frame, the wireless LAN transmission/reception function unit 202 transfers a frame to the wireless LAN/MAC function unit 602, as usual, and simultaneously supplies the wireless LAN/MAC header analysis unit 206 of the pseudo ACK generation function unit 201 with the frame.

Further, the wireless LAN transmission/reception function unit 202 notifies the timer function unit 205 (FIG. 6B) of reception completion time, in order to know timing.

If the frame type of the frame is a data frame and if the transmission source address is of the wireless LAN terminal device 105 as a target of a terminal device to ensure communication quality, the wireless LAN header analysis unit according to this embodiment supplies the frame to the pseudo ACK transmission determination unit 207.

The pseudo ACK transmission determination unit 207 analyzes a FCS (frame check sequence) by an error detection unit 207b. Only if an error data frame is detected from the FCS, the pseudo ACK transmission determination unit 207 instructs the pseudo ACK generation function unit 208 to process generation of a pseudo ACK.

The pseudo ACK generation function unit 208 generates a pseudo ACK, regarding an address of a corresponding wireless LAN terminal device 105 as a destination address of a wireless LAN/MAC header of the ACK.

Further, the pseudo ACK generation function unit 208 receives an error data frame, and thereafter receives a notification of elapse of SIFS time from the timer function unit 205. Immediately then, the unit 208 transmits the pseudo ACK to the wireless LAN terminal device 105 through the wireless LAN transmission/reception function unit 202.

The wireless base station device 501 may count, by the pseudo ACK transmission determination unit 207, the number of retransmissions to the wireless LAN terminal device 105 as a target wireless terminal. Only when a particular number of retransmissions is exceeded, the wireless base station device 501 may restrict the maximum number of retransmissions. In addition, an upper limit to the number of retransmissions may be changed depending on a degree of quality to ensure.

(2-2) Operation of Wireless LAN Base Station Device

Figure 7:
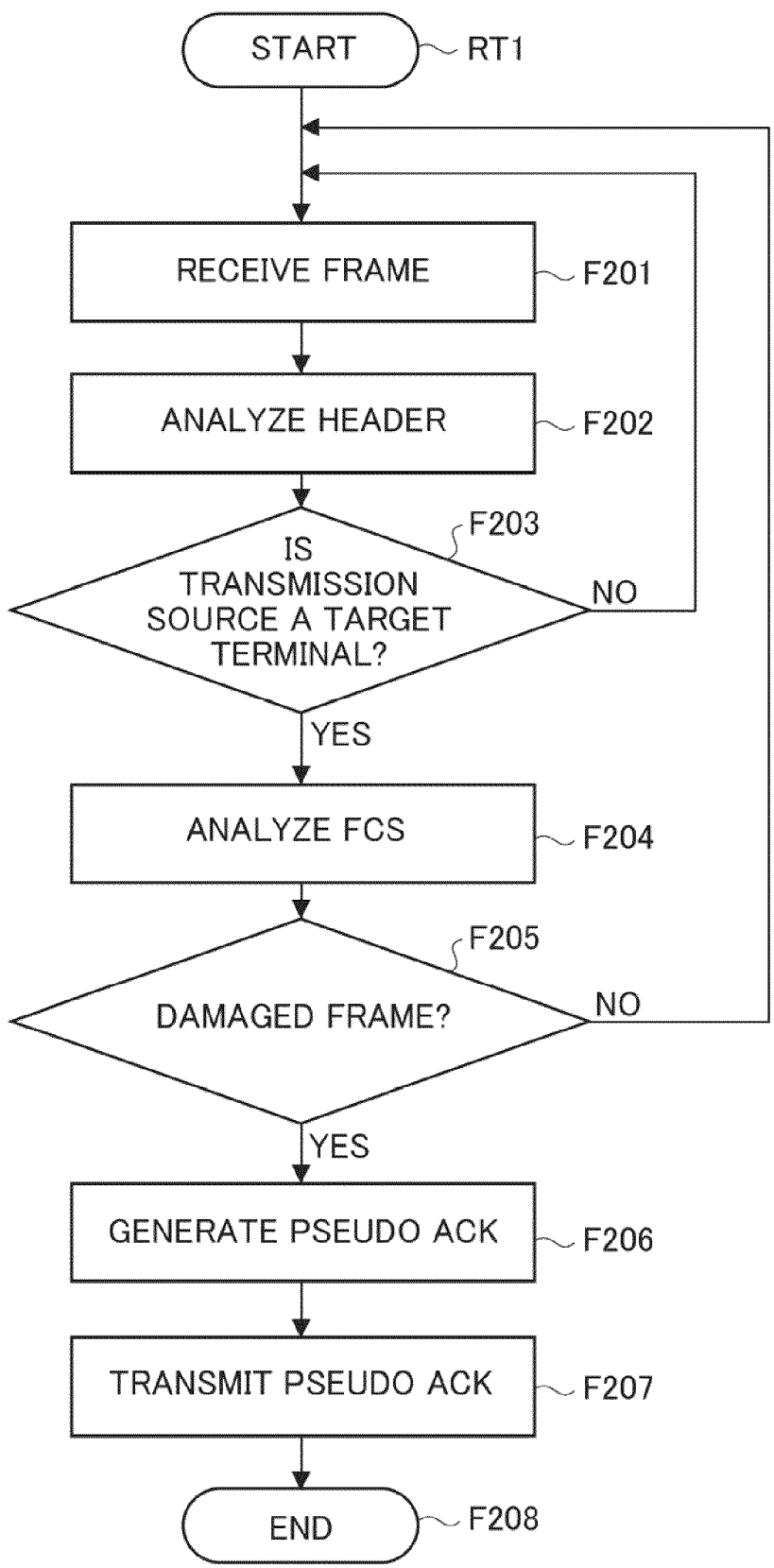
FIG. 7 A flowchart representing operation of a pseudo ACK transmission wireless terminal device according to the second embodiment of the present invention.

Operation of the wireless LAN base station device 501 in the wireless communication control system according to the second embodiment will now be described in detail with reference to a flowchart in FIG. 7 and a diagram depicting a configuration of the wireless LAN base station device 501 in FIGS. 6A, 6B.

At first, the wireless LAN base station device 501 receives a frame (step F201), analyzes then a wireless LAN/MAC header (step F202), and checks whether the transmission source address thereof is of a target terminal of a pseudo ACK or not (step F203).

In case of being not a target terminal device, the processing returns to step F201. However, in case of a target terminal device, an error detection unit 207b in the pseudo ACK transmission determination unit 207 analyzes a FCS (step F204), and determines whether the received frame is an error data frame (referred to as a damaged frame in the figure) or not, from the FCS (step F205).

In case of an error data frame, usually, no ACK frame is transmitted. Therefore, the pseudo ACK frame is determined to be transmitted, and the pseudo ACK generation function unit 208 generates a pseudo ACK (step F206), and transmits the pseudo ACK through the wireless LAN transmission/reception function unit 202 to a corresponding wireless LAN terminal device (step F207).

Otherwise, in case of not being an error data frame, an ACK frame is transmitted to the wireless LAN terminal device, as usual, and the processing therefore returns to step F201.

(2-3) Effects of Wireless Communication Control System According to Second Embodiment According to this embodiment, the wireless communication control system according to this embodiment can restrict retransmissions using MAC of the wireless LAN as the wireless LAN base station device 501 transmits a pseudo ACK even when an error data frame (damaged frame) is generated.

In this manner, a delay in wireless LAN part can be decreased, and as a result, communication quality can be ensured.

The pseudo ACK according to this embodiment deals with link-by-link communication as a target, like in the first embodiment. Therefore, head of line blocking can be eliminated.

That is, conventionally, when plural flows are queued into one queue, a head frame continues being retransmitted, thereby making the head frame stay at the queue and blocking frame transmission of following flows.

In contrast, according to this embodiment, as the wireless LAN base station device 501 transmits a pseudo ACK, the wireless LAN terminal device 105 determines the transmission to be successful, and frames can thereby avoid staying at a queue.

Third Embodiment

(3) Wireless Communication Control System According to Third Embodiment

(3-1) Configuration of Wireless Communication Control System

In the third embodiment, a communication quality of the target terminal of the pseudo ACK in the first and second embodiments described above is not monitored by a preregistered target terminal but is monitored by the pseudo ACK generation function unit 201. The target terminal of the pseudo ACK is thereby determined.

Figure 8A:
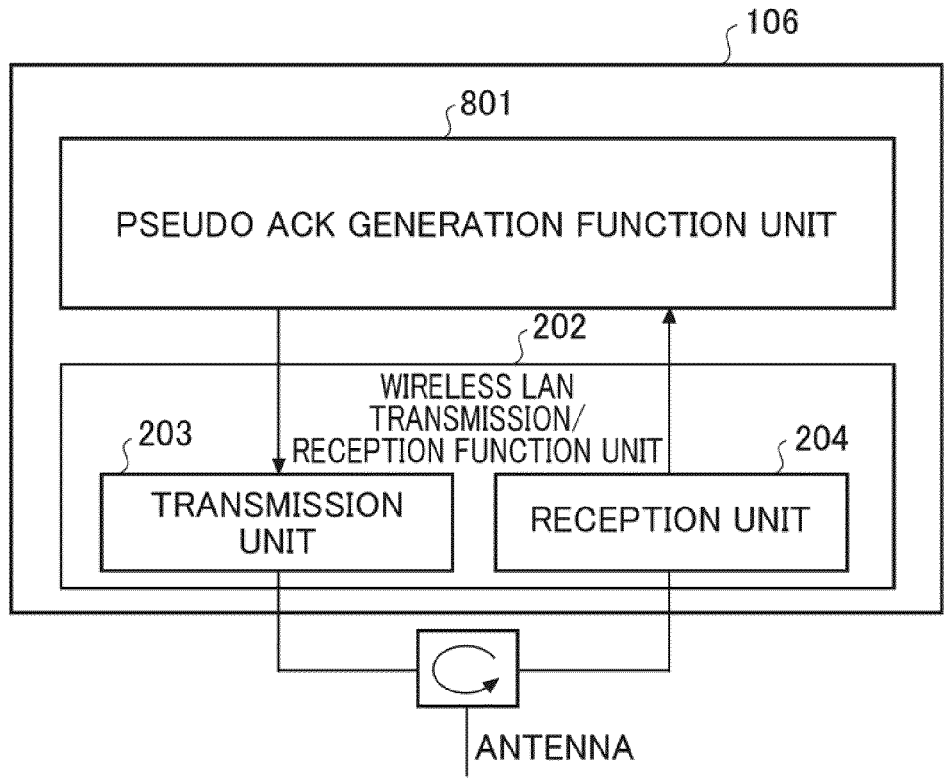
FIGS. 8A, 8B Block diagrams representing configurations of a pseudo ACK transmission wireless terminal device and a pseudo ACK generation function unit according to the third embodiment of the present invention.
Figure 8B:
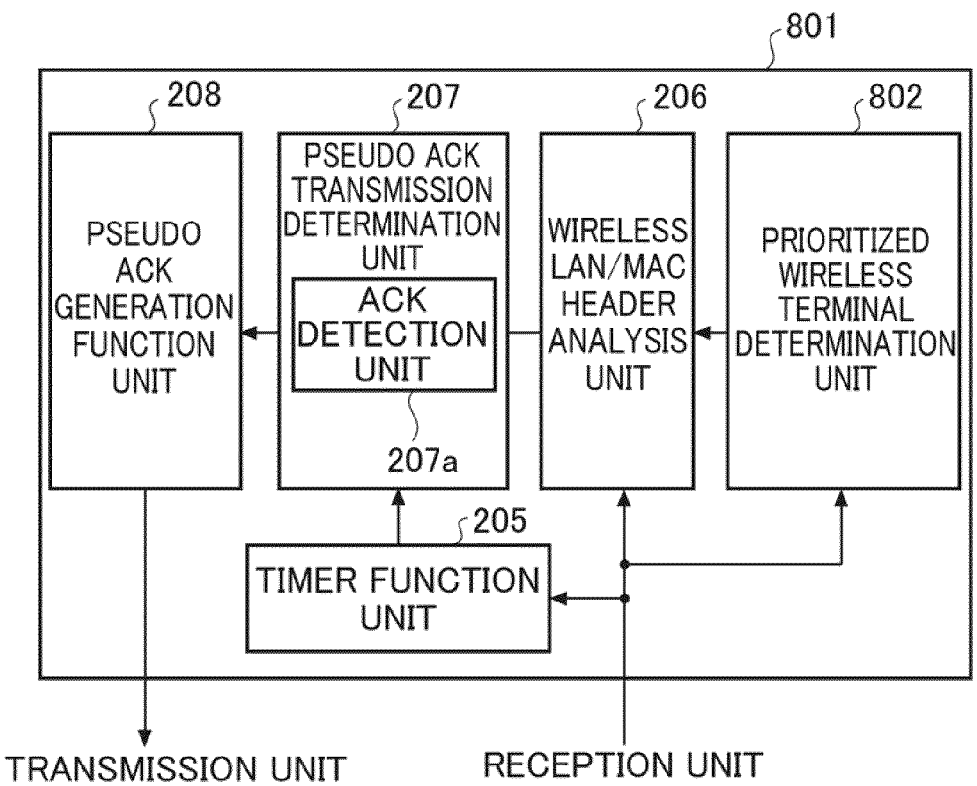

Now, a pseudo ACK generation function unit in a pseudo ACK transmission terminal device 106 in the third embodiment will be depicted in a block diagram in FIGS. 8A, 8B.

Referring to FIGS. 8A, 8B, a pseudo ACK generation function unit 801 differs in that the pseudo ACK generation function unit 801 is provided with a priority wireless terminal determination unit 802.

The priority wireless terminal determination unit 802 monitors a communication quality by receiving a frame of the wireless LAN from a reception unit 204 in the pseudo ACK transmission terminal device 106. According to the communication quality and/or a determination standard of each wireless LAN terminal device, the priority wireless terminal determination unit 802 determines a wireless LAN terminal device as a target to which a pseudo ACK is to be transmitted or not.

Further, the priority wireless terminal determination unit 802 notifies the wireless LAN/MAC header analysis unit 206 of a MAC address of the determined wireless LAN terminal device.

Subsequent operation is the same as that in first embodiment. As depicted in the operation of the second embodiment, a pseudo ACK may be generated and sent only if an error data frame is detected from a FCS (see FIG. 9). A pseudo ACK may be generated and transmitted for the wireless LAN terminal device whenever a wireless LAN terminal device is determined as a target is determined.

Content of the communication quality to be monitored may be a traffic type.

Specifically, for example, an IP (Internet Protocol) telephone terminal is treated as a target terminal. However, a terminal which performs communication of an web application is not treated as a target terminal.

Alternatively, content of the communication quality to be monitored may be a flow.

Specifically, for example, a 5-tuple combination of a transmission source IP address, an destination IP address, a protocol number, a transmission source TCP port number, and a destination TCP port number is treated as one flow.

Therefore, there is a case that even in the same terminal, a flow is a target of a pseudo ACK and another flow is not a target of a pseudo ACK.

Content of the communication quality to be monitored may be a band state.

Specifically, for example, a band occupancy is obtained from QBSS Load in a beacon frame, which is a notification information frame of the wireless LAN. If the band is clouded, a terminal which makes communication of a specific traffic type is determined to be a target terminal.

Separately from the band occupancy, a target terminal of a pseudo ACK may be determined based on a maximum communication speed indicating a maximum capacity of a band.

Specifically, for example, the maximum communication speed of IEEE802.11b is 11 Mbps. However, IEEE802.11g is capable of making high speed communication of 54 Mbps since physical modulation methods differ.

A target terminal of a pseudo ACK may be determined based on the difference in band capacity. Further, a target terminal of a pseudo ACK may be determined from time change of band states.

Content of a communication quality to be monitored may be communication quality.

Specifically, for example, communication quality of a traffic for which quality is to be ensured may be obtained, and a terminal which does not satisfy required quality may be a target of a pseudo ACK.

Alternatively, content of the communication quality to be monitored may be a transmission terminal and a past transmission history.

Specifically, for example, the number of retransmissions to a transmission terminal may be detected, and a terminal which performed more retransmission than other terminals may be taken as a target terminal of a pseudo ACK.

Alternatively, content of the communication quality to be monitored may be a state of a terminal. Specifically, for example, the state of a terminal means that a target terminal of a pseudo ACK may be determined by knowing whether an emergency mode such as no remaining battery level or SOS is occurring or not by any method.

Content to be monitored may be a combination of any of the traffic type, flow, band, communication quality, past transmission history, and terminal mode as described above. Based on the combination, a wireless LAN terminal device as a target may be determined.

A target terminal may be determined by predicting a future communication from one of or any combination of the traffic type, flow, band, communication quality, past transmission history, and terminal mode as described above.

The wireless LAN terminal device can dynamically change by the priority wireless terminal determination unit 802, and may be changed on real time, based on content of the communication.

Also, in the second embodiment, the pseudo ACK generation function unit 201 is provided with the traffic detection function unit 206, and a wireless LAN terminal device can be determined from a used traffic.

The wireless LAN/MAC header analysis unit 206 may count the number of retransmissions of a corresponding wireless LAN terminal device, and notify the pseudo ACK frame transmission determination unit 207 of a counted value. The pseudo ACK frame transmission determination unit 207 may determine transmission of a pseudo ACK only when a particular number of retransmissions is exceeded.

The flowchart of FIG. 9 representing operation of the third embodiment is to perform the same processing as in the first and second embodiments. Therefore, descriptions of the flowchart will be omitted herefrom.

(3-2) Effects of Wireless Communication Control System According to Third Embodiment According to the third embodiment, a further effect in addition to effects of the first and second embodiments is obtained in that a corresponding wireless LAN terminal device can be determined in accordance with change of the communication and/or states of terminals, and delay time of the wireless LAN terminal device can be thereby reduced.

(4) Other Embodiments

In the first to third embodiments according to the present invention, an error state of a transmitted data frame or a receiving state of a pseudo ACK is monitored to determine transmission of a pseudo ACK. However, embodiments according to the invention are not limited to these embodiments. For example, when transmission of a data frame is monitored, a determination may then be made so that one or plural ACKs should be transmitted, without monitoring an error state of a transmitted data frame or a receiving state of an ACK, i.e., regardless of these states. The one or plural ACKs may then be generated and transmitted.

Even in case of targeting ensuring of communication quality only from a transmitted frame of a data frame, a determination may be made so that one or plural ACKs should be transmitted. The one or plural ACKs may then be generated and transmitted.

The first to third embodiments according to the invention have been described referring to an example of a wireless LAN as an applicable communication system according to the invention. Therefore, a destination address of a pseudo ACK is a MAC address. However, the embodiments according to the invention are not limited to this example. In another communication system to which the embodiments are applicable, a destination address other than a MAC address can be taken as a destination address of a pseudo ACK.

Processing units in each of the embodiments described above can be operated by a program.

Also, according to the present invention, a pseudo acknowledgement frame transmission device has a monitor means that monitors an acknowledgement frame to be transmitted to a first communication device. Based on a pseudo acknowledgement frame transmission condition, a pseudo acknowledgement frame can be generated and transmitted. Therefore, quality can be ensured for each communication device.

In this case, for example, a QoS (quality of service) function of a wireless LAN defined by IEEE802.11e or WMM (Wi-Fi Multimedia) is classified into four classes. For each of the classes, parameters determining transmission timing are given order of superiority thereby to actualize the QoS.

Therefore, not only a target for monitoring an acknowledgement packet frame is determined for each of communication devices but also order of superiority can be given within the same class. In this manner, a pseudo acknowledgement frame communication system, a pseudo acknowledgement frame communication method, a pseudo acknowledgement frame transmission device, a pseudo acknowledgement frame transmission method, and a pseudo acknowledgement frame transmission program can be actualized avoiding a great delay in communication and deterioration in quality from being recognized as occurring.

Typical embodiments of the present invention have been specifically described above. However, various changes, substitutions, and alternatives to the invention should be understood to be available without departing from the spirit or scope of the present invention specified in appended claims. The present inventor intends that a scope equivalent to that of the claimed invention should be maintained even if any of the claims should be amended in the procedure of the present application for a patent.

INDUSTRIAL APPLICABILITY

The present invention is applicable to wireless LAN communication.

REFERENCE SIGNS LIST

101: Wireless LAN base station device
102, 103, 104, 105: Wireless LAN terminal device
106: Pseudo ACK transmission wireless terminal device
201: Pseudo ACK generation function unit
202: Wireless LAN transmission/reception function unit
203: Transmission function unit
204: Reception function unit
205: Timer function unit
206: Wireless LAN/MAC header analysis unit
207: Pseudo ACK transmission determination unit
207a: ACK detection unit
207b: Error detection unit
208: Pseudo ACK generation function unit
501: Wireless LAN base station device
602: Wireless LAN/MAC function unit
604: Pseudo ACK generation function unit
801: Pseudo ACK generation function unit
802: Prioritized wireless terminal determination unit

The invention claimed is:

1. A pseudo acknowledgement frame communication system comprising:
   at least one communication device that transmits a frame;
   a second communication device that receives the frame; and
   a pseudo acknowledgement frame transmission device that monitors communication between the first and second communication devices,
wherein
   the first communication device comprises:
   a frame transmission unit for transmitting a transmission frame to the second communication device; and
   an acknowledgement frame reception unit for receiving an acknowledgement frame transmitted by the second communication device,
wherein
   the second communication device comprises:
   an acknowledgement frame transmission unit for transmitting the acknowledgement frame upon receiving the transmission frame from the first communication device, and
wherein
   the pseudo acknowledgement frame transmission device comprises:
   a monitor unit for monitoring the transmission frame transmitted by the first communication device and the acknowledgement frame transmitted by the second communication device; and
   a pseudo acknowledgement frame transmission unit for generating a pseudo acknowledgement frame if a monitor result by the monitor unit satisfies a pseudo acknowledgement frame transmission condition, and transmitting the generated pseudo acknowledgement frame to the first communication device.

2. A pseudo acknowledgement frame communication method for a pseudo acknowledgement frame communication system including at least one communication device that transmits a frame, a second communication device that receives the frame, and a pseudo acknowledgement frame transmission device that monitors communication between the first and second communication devices, the pseudo acknowledgement frame communication method comprising:
   a frame transmission step in which the first communication device transmits a transmission frame to the second communication device;
   an acknowledgement frame transmission step in which the second communication device transmits the acknowledgement frame upon receiving the transmission frame from the first communication device;
   a monitor step in which the pseudo acknowledgement frame transmission device monitors the transmission frame transmitted by the first communication device and the acknowledgement frame transmitted by the second communication device;
   a pseudo acknowledgement frame transmission step in which the pseudo acknowledgement frame transmission device generates a pseudo acknowledgement frame if a monitor result by the monitor step satisfies a pseudo acknowledgement frame transmission condition, and transmits the generated pseudo acknowledgement frame to the first communication device; and
   an acknowledgement frame reception step in which the first communication device receives the acknowledgement frame transmitted in the acknowledgement frame transmission step or the pseudo acknowledgement frame transmitted in the pseudo acknowledgement frame transmission step.

3. A pseudo acknowledgement frame transmission device, comprising:
   a monitor unit for monitoring a transmission frame transmitted by a first communication device of a plurality of first communication devices and an acknowledgement frame that is transmitted by a second communication device upon receipt of the transmission frame from the first communication device; and
   a pseudo acknowledgement frame transmission unit for generating a pseudo acknowledgement frame if a monitor result by the monitor unit satisfies a pseudo acknowledgement frame transmission condition predetermined concerning communication between the first communication device and the second communication device, and transmitting the generated pseudo acknowledgement frame to the first communication device,
   wherein, the pseudo acknowledgement frame transmission device further comprises a prioritized communication device determination unit for determining which one of the first communication devices of the plurality of first communication devices to be monitored with priority, based on content to be monitored,
   wherein at least one of the transmission frame series of the one of the first communication devices, which is determined by the prioritized communication device determination unit, and the acknowledgement frame series corresponding to the at least one of the transmission frame series are monitored.

4. The pseudo acknowledgement frame transmission device according to claim 3, wherein the pseudo acknowledgement frame transmission condition is that the pseudo acknowledgement frame is generated and transmitted if an error is determined as occurring in the transmission frame monitored by a monitor unit.

5. The pseudo acknowledgement frame transmission device according to claim 3, wherein the pseudo acknowledgement frame transmission condition is that the pseudo acknowledgement frame is generated and transmitted if an acknowledgement frame corresponding to a transmission frame is not detected.

6. The pseudo acknowledgement frame transmission device according to claim 3, wherein the pseudo acknowledgement frame transmission condition is that
   if the number of retransmissions of the transmission frame due to a retransmission function which the first communication device has exceeds a predetermined number of retransmissions, the pseudo acknowledgement frame is generated and transmitted to the first communication device.

7. The pseudo acknowledgement frame transmission device according to claim 3, wherein
   the content to be monitored is one of or any combination of a traffic type, a flow, a band occupancy, communication quality, a past transmission history terminal, and a state of the first communication device, and
   the first communication device to be monitored with priority is selected from among of the plurality of first communication devices.

8. The pseudo acknowledgement frame transmission device according to claim 3, wherein
   the prioritized communication device determination unit further comprises a dynamic change determination unit for determining and dynamically changing the one of the first communication devices to be monitored, based on the content to be monitored.

9. The pseudo acknowledgement frame transmission device according to claim 3, wherein the pseudo acknowledgement frame is an acknowledgement frame in a data link layer.

10. A communication device comprising the pseudo acknowledgement frame transmission device according to claim 3.

11. A pseudo acknowledgement frame communication system, comprising the pseudo acknowledgement frame transmission device according to claim 3.

12. A pseudo acknowledgement frame transmission method in a pseudo acknowledgement frame transmission device that monitors frames used in communication between a first communication device and a second communication device, comprising:
   a monitor step of monitoring a transmission frame transmitted by the first communication device of a plurality of first communication devices and an acknowledgement frame that is transmitted by the second communication device upon receipt of the transmission frame from the first communication device; and
   a pseudo acknowledgement frame transmission step of generating a pseudo acknowledgement frame if a monitor result by the monitor step satisfies a pseudo acknowledgement frame transmission condition predetermined concerning communication between the first communication device and the second communication device, and transmitting the generated pseudo acknowledgement frame to the first communication device,
   wherein, the pseudo acknowledgment frame transmission method further comprises a prioritized communication device determination step of determining which one of the first communication devices of the plurality of first communication devices to be monitored with priority, based on content to be monitored,
   wherein at least one of the transmission frame series of the one of the first communication devices, which is determined by the prioritized communication device determination step, and the acknowledgement frame series corresponding to the at least one of the transmission frame series are monitored.

13. The pseudo acknowledgement frame transmission method according to claim 12, wherein the pseudo acknowledgement frame transmission condition is that
   the pseudo acknowledgement frame is generated and transmitted if an error is determined as occurring in the transmission frame monitored by the monitor step.

14. The pseudo acknowledgement frame transmission method according to claim 12, wherein
   the pseudo acknowledgement frame transmission condition is that the pseudo acknowledgement frame is generated and transmitted if an acknowledgement frame corresponding to a transmission frame is not detected.

15. The pseudo acknowledgement frame transmission method according to claim 12, wherein the pseudo acknowledgement frame transmission condition is that
   if a number of retransmissions of the transmission frame due to a retransmission function which the first communication device has exceeds a predetermined number of retransmissions, the pseudo acknowledgement frame is generated and transmitted to the first communication device.

16. The pseudo acknowledgement frame transmission method according to claim 12, wherein
the content to be monitored is one of or any combination of a traffic type, a flow, a band occupancy, communication quality, past transmission history terminal, and a state of the first communication device, and
the first communication device to be monitored with priority is selected from among of the plurality of first communication devices.

17. The pseudo acknowledgement frame transmission method according to claim 12, wherein
the prioritized communication device determination step further comprises a dynamic change determination step of determining and dynamically changing the one of the first communication devices to be monitored, based on the content to be monitored.

18. The pseudo acknowledgement frame transmission method according to claim 12, wherein
the pseudo acknowledgement frame is an acknowledgement frame in a data link layer.

19. A pseudo acknowledgement frame communication method for a pseudo acknowledgement frame communication system including at least one communication device that transmits a frame, a second communication device that receives the frame, and a pseudo acknowledgement frame transmission device that monitors communication between the first and second communication devices, the pseudo acknowledgement frame communication method comprising:
a frame transmission step in which the first communication device transmits a transmission frame to the second communication device;
an acknowledgement frame transmission step in which the second communication device transmits the acknowledgement frame upon receiving the transmission frame from the first communication device;
a monitor step in which the pseudo acknowledgement frame transmission device monitors the transmission frame transmitted by the first communication device and the acknowledgement frame transmitted by the second communication device;
a pseudo acknowledgement frame transmission step in which the pseudo acknowledgement frame transmission device generates a pseudo acknowledgement frame if a monitor result by the monitor step satisfies a pseudo acknowledgement frame transmission condition, and transmits the generated pseudo acknowledgement frame to the first communication device; and
an acknowledgement frame reception step in which the first communication device receives the acknowledgement frame transmitted in the acknowledgement frame transmission step or the pseudo acknowledgement frame transmitted in the pseudo acknowledgement frame transmission step,
further comprising each of the steps of the pseudo acknowledgement frame transmission method according to claim 12.

20. A pseudo acknowledgement frame transmission program product, embodied on a non-transitory computer readable medium, when the program product is executed by a computer, causing the computer to function as a pseudo acknowledgement frame transmission device, the pseudo acknowledgement frame transmission device comprising:
a monitor unit for monitoring a transmission frame transmitted by a first communication device of a plurality of first communication devices and an acknowledgement frame that is transmitted by a second communication device upon receipt of the transmission frame from the first communication device; and
a pseudo acknowledgement frame transmission unit for generating a pseudo acknowledgement frame if a monitor result by the monitor unit satisfies a pseudo acknowledgement frame transmission condition predetermined concerning communication between the first communication device and the second communication device, and transmitting the generated pseudo acknowledgement frame to the first communication device,
wherein, the pseudo acknowledgement frame transmission device further comprises a prioritized communication device determination unit for determining which one of the first communication devices of the plurality of first communication devices to be monitored with priority, based on content to be monitored, and
wherein at least one of the transmission frame series of the one of the first communication devices, which is determined by the prioritized communication device determination unit, and the acknowledgement frame series corresponding to the at least one of the transmission frame series are monitored.

21. The pseudo acknowledgement frame transmission program product according to claim 20, wherein the pseudo acknowledgement frame transmission condition is that the pseudo acknowledgement frame is generated and transmitted if an error is determined as occurring in the transmission frame monitored by the monitor unit.

22. The pseudo acknowledgement frame transmission program product according to claim 20, wherein the pseudo acknowledgement frame transmission condition is that the pseudo acknowledgement frame is generated and transmitted if an acknowledgement frame corresponding to a transmission frame is not detected.

23. The pseudo acknowledgement frame transmission program product according to claim 20, wherein the pseudo acknowledgement frame transmission condition is that
if a number of retransmissions of the transmission frame due to a retransmission function which the first communication device has exceeds a predetermined number of retransmissions, the pseudo acknowledgement frame is generated and transmitted to the first communication device.

24. The pseudo acknowledgement frame transmission program product according to claim 20, wherein
the content to be monitored is one of or any combination of a traffic type, a flow, a band occupancy, communication quality, past transmission history terminal, and a state of the first communication device, and
the first communication device to be monitored with priority is selected from among of the plurality of first communication devices.

25. The pseudo acknowledgement frame transmission program product according to claim 20, wherein
the prioritized communication device determination unit further comprises a dynamic change determination unit for determining and dynamically changing the one of the first communication devices to be monitored, based on the content to be monitored.

26. The pseudo acknowledgement frame transmission program product according to claim 20, wherein the pseudo acknowledgement frame is an acknowledgement frame in a data link layer.

27. The pseudo acknowledgement frame communication system according to claim 1, wherein the pseudo acknowledgement frame transmission condition is that the pseudo acknowledgement frame is generated and transmitted if an error is determined as occurring in the transmission frame monitored by a monitor unit.

28. The pseudo acknowledgement frame communication system according to claim 1, wherein the pseudo acknowledgement frame transmission condition is that the pseudo acknowledgement frame is generated and transmitted if an acknowledgement frame corresponding to a transmission frame is not detected.

29. The pseudo acknowledgement frame communication system according to claim 1, wherein the pseudo acknowledgement frame transmission condition is that
if the number of retransmissions of the transmission frame due to a retransmission function which the first communication device has exceeds a predetermined number of retransmissions, the pseudo acknowledgement frame is generated and transmitted to the first communication device.

30. The pseudo acknowledgement frame communication system according to claim 1, to cope with a plurality of first communication devices, further comprising a prioritized communication device determination unit for determining one of the first communication devices to be monitored with priority, based on content to be monitored, wherein
at least one of the transmission frame series of the one of the first communication devices, which is determined by the prioritized communication device determination unit, and the acknowledgement frame series corresponding to the at least of the transmission frame series are monitored.

31. The pseudo acknowledgement frame communication system according to claim 1, wherein
the content to be monitored is one of or any combination of a traffic type, a flow, a band occupancy, communication quality, a past transmission history terminal, and a state of the first communication device, and
the first communication device to be monitored with priority is selected from among of the plurality of first communication devices.

32. The pseudo acknowledgement frame communication system according to claim 1, wherein
the prioritized communication device determination unit further comprises a dynamic change determination unit for determining and dynamically changing the one of the first communication devices to be monitored, based on the content to be monitored.

33. The pseudo acknowledgement frame communication system according to claim 1, wherein the pseudo acknowledgement frame is an acknowledgement frame in a data link layer.

34. The pseudo acknowledgement frame communication method according to claim 2, wherein the pseudo acknowledgement frame transmission condition is that the pseudo acknowledgement frame is generated and transmitted if an error is determined as occurring in the transmission frame monitored by a monitor unit.

35. The pseudo acknowledgement frame communication method according to claim 2, wherein the pseudo acknowledgement frame transmission condition is that the pseudo acknowledgement frame is generated and transmitted if an acknowledgement frame corresponding to a transmission frame is not detected.

36. The pseudo acknowledgement frame communication method according to claim 2, wherein the pseudo acknowledgement frame transmission condition is that
if the number of retransmissions of the transmission frame due to a retransmission function which the first communication device has exceeds a predetermined number of retransmissions, the pseudo acknowledgement frame is generated and transmitted to the first communication device.

37. The pseudo acknowledgement frame communication method according to claim 2, to cope with a plurality of first communication devices, further comprising a prioritized communication device determination unit for determining one of the first communication devices to be monitored with priority, based on content to be monitored, wherein
at least one of the transmission frame series of the one of the first communication devices, which is determined by the prioritized communication device determination unit, and the acknowledgement frame series corresponding to the at least of the transmission frame series are monitored.

38. The pseudo acknowledgement frame communication method according to claim 2, wherein
the content to be monitored is one of or any combination of a traffic type, a flow, a band occupancy, communication quality, a past transmission history terminal, and a state of the first communication device, and
the first communication device to be monitored with priority is selected from among of the plurality of first communication devices.

39. The pseudo acknowledgement frame communication method according to claim 2, wherein
the prioritized communication device determination unit further comprises a dynamic change determination unit for determining and dynamically changing the one of the first communication devices to be monitored, based on the content to be monitored.

40. The pseudo acknowledgement frame communication method according to claim 2, wherein the pseudo acknowledgement frame is an acknowledgement frame in a data link layer.

* * * * *